US010349190B2

(12) United States Patent
Pedersen et al.

(10) Patent No.: US 10,349,190 B2
(45) Date of Patent: *Jul. 9, 2019

(54) HEARING DEVICE WITH MODEL CONTROL AND ASSOCIATED METHODS

(71) Applicant: GN HEARING A/S, Ballerup (DK)

(72) Inventors: Brian Dam Pedersen, Ringsted (DK); Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,583

(22) Filed: Feb. 5, 2018

(65) Prior Publication Data

US 2018/0160240 A1 Jun. 7, 2018

Related U.S. Application Data

(63) Continuation of application No. 15/595,526, filed on May 15, 2017, now Pat. No. 9,924,278, which is a (Continued)

(30) Foreign Application Priority Data

Jul. 2, 2015 (DK) ..................................... 1517513
Jul. 2, 2015 (DK) ........................... PA 2015 70433

(51) Int. Cl.
*H04R 25/00* (2006.01)
*G06F 21/57* (2013.01)
(Continued)

(52) U.S. Cl.
CPC ........... *H04R 25/505* (2013.01); *G06F 21/57* (2013.01); *G06F 21/64* (2013.01); *H04R 25/70* (2013.01);
(Continued)

(58) Field of Classification Search
CPC .................................................... H04R 25/00
See application file for complete search history.

(56) References Cited

U.S. PATENT DOCUMENTS 5,757,920 A   5/1998 Misra et al.
5,809,140 A   9/1998 Rubin et al.
(Continued)

FOREIGN PATENT DOCUMENTS

DE   102 00 796 A1   7/2003
DK   2013 70266 A1   11/2014
(Continued)

OTHER PUBLICATIONS

Final Office Action dated Sep. 19, 2018 for related U.S. Appl. No. 15/697,406.
(Continued)

*Primary Examiner* — Olisa Anwah
(74) *Attorney, Agent, or Firm* — Vista IP Law Group, LLP

(57) ABSTRACT

A hearing device includes: a processing unit configured to compensate for hearing loss of a user of the hearing device; and a memory unit, wherein the memory unit is configured to store model data comprising model information data indicative of available models for the hearing device, the model information data comprising first model information; wherein the processing unit is configured to: verify the model data, and reject the model data if verification of the model data fails.

50 Claims, 9 Drawing Sheets

Related U.S. Application Data continuation of application No. 14/793,466, filed on Jul. 7, 2015, now Pat. No. 9,729,983.

(51) Int. Cl.
   *G06F 21/64* (2013.01)
   *G06F 21/44* (2013.01)

(52) U.S. Cl.
   CPC ............. *G06F 21/44* (2013.01); *H04R 25/55* (2013.01); *H04R 25/554* (2013.01); *H04R 2225/55* (2013.01)

(56) References Cited

U.S. PATENT DOCUMENTS

| | | | |
|---|---|---|---|
| 6,055,575 | A | 4/2000 | Paulsen |
| 6,556,686 | B1 | 4/2003 | Weidner |
| 6,658,307 | B1 | 12/2003 | Mueller |
| 6,724,862 | B1 | 4/2004 | Shafferi |
| 8,166,312 | B2 | 4/2012 | Waldmann et al. |
| 8,670,355 | B1 | 3/2014 | Frerking |
| 8,812,851 | B2 | 8/2014 | Schwarz |
| 9,219,966 | B2 | 12/2015 | Wang |
| 9,402,179 | B1 | 7/2016 | Miller |
| 9,608,807 | B2 | 3/2017 | Pedersen et al. |
| 9,613,028 | B2 | 4/2017 | Foo |
| 9,877,123 | B2 | 1/2018 | Pedersen |
| 9,887,848 | B2 | 2/2018 | Pedersen |
| 2002/0054689 | A1 | 5/2002 | Zhang et al. |
| 2002/0169717 | A1 | 11/2002 | Challener |
| 2002/0196159 | A1 | 12/2002 | Lesenne et al. |
| 2004/0071304 | A1 | 4/2004 | Yanz |
| 2004/0117650 | A1 | 6/2004 | Karaoguz et al. |
| 2004/0117818 | A1 | 6/2004 | Karaoguz et al. |
| 2004/0125958 | A1 | 7/2004 | Brewster |
| 2004/0162980 | A1 | 8/2004 | Lesenne et al. |
| 2005/0154889 | A1 | 7/2005 | Ashley et al. |
| 2006/0005237 | A1 | 1/2006 | Kobata et al. |
| 2006/0129848 | A1 | 6/2006 | Paksoy |
| 2007/0078866 | A1 | 4/2007 | Takashima |
| 2008/0049957 | A1 | 2/2008 | Topholm |
| 2009/0210699 | A1 | 8/2009 | Grewal et al. |
| 2010/0067711 | A1 | 3/2010 | Waldmann |
| 2010/0104122 | A1 | 4/2010 | Waldmann |
| 2010/0205447 | A1 | 8/2010 | Waldmann |
| 2010/0290627 | A1 | 11/2010 | Tsuji et al. |
| 2010/0306525 | A1 | 12/2010 | Ferguson |
| 2011/0188684 | A1 | 8/2011 | Spieler et al. |
| 2011/0293124 | A1 | 12/2011 | Ma |
| 2012/0036364 | A1 | 2/2012 | Yoneda et al. |
| 2012/0140962 | A1* | 6/2012 | Ubezio ................ H04R 25/558 381/314 |
| 2012/0252411 | A1 | 10/2012 | Johnsgard et al. |
| 2012/0252531 | A1 | 10/2012 | King |
| 2013/0024798 | A1 | 1/2013 | Schneider |
| 2013/0077791 | A1 | 3/2013 | Kozuka et al. |
| 2013/0177188 | A1 | 7/2013 | Apfel |
| 2013/0177189 | A1 | 7/2013 | Bryant |
| 2013/0202138 | A1 | 8/2013 | Nishizaki et al. |
| 2013/0251179 | A1 | 9/2013 | Aschoff |
| 2013/0257364 | A1 | 10/2013 | Redding |
| 2013/0290733 | A1 | 10/2013 | Branton et al. |
| 2013/0290734 | A1 | 10/2013 | Branton et al. |
| 2013/0329924 | A1 | 12/2013 | Fleizach |
| 2014/0004825 | A1 | 1/2014 | Prakash |
| 2014/0050341 | A1 | 2/2014 | Flynn |
| 2014/0193008 | A1 | 7/2014 | Zukic |
| 2014/0211973 | A1 | 7/2014 | Wang et al. |
| 2014/0289516 | A1 | 9/2014 | Sahay |
| 2014/0331064 | A1 | 11/2014 | Ballesteros |
| 2014/0334629 | A1 | 11/2014 | Andersen et al. |
| 2014/0341405 | A1 | 11/2014 | Pedersen et al. |
| 2015/0023512 | A1 | 1/2015 | Shennib |
| 2015/0023534 | A1 | 1/2015 | Shennib |
| 2015/0289062 | A1 | 10/2015 | Ungstrup |
| 2016/0142838 | A1 | 5/2016 | Thomsen |
| 2016/0198271 | A1 | 7/2016 | Shennib |
| 2016/0255448 | A1 | 9/2016 | Morant |
| 2016/0337769 | A1 | 11/2016 | Siddhartha |
| 2017/0006902 | A1 | 1/2017 | Pedersen |
| 2017/0099550 | A1 | 4/2017 | Blessing et al. |
| 2017/0180419 | A1 | 6/2017 | Pedersen et al. |
| 2017/0180886 | A1 | 6/2017 | Van Der Loo |
| 2017/0286918 | A1 | 10/2017 | Westermann |
| 2017/0318400 | A1* | 11/2017 | Westermann ........ H04R 25/554 |
| 2017/0318457 | A1 | 11/2017 | Westermann |

FOREIGN PATENT DOCUMENTS

| | | |
|---|---|---|
| EP | 1 582 958 A2 | 10/2005 |
| EP | 2 760 225 A1 | 7/2014 |
| EP | 2 928 212 A1 | 10/2015 |
| EP | 3 021 545 A1 | 5/2016 |
| EP | 3 032 845 A1 | 6/2016 |
| WO | WO 2007/098605 A1 | 9/2007 |
| WO | WO 2007/144435 A2 | 12/2007 |
| WO | WO 2007/144435 A3 | 12/2007 |
| WO | WO 2013/091693 A1 | 6/2013 |
| WO | WO 2014/094866 A1 | 6/2014 |
| WO | WO 2015132419 A2 | 9/2015 |
| WO | WO 2016/078711 | 5/2016 |
| WO | WO 2016/096011 | 6/2016 |

OTHER PUBLICATIONS

Final Office Action dated Sep. 21, 2018 for related U.S. Appl. No. 15/941,816.

Advisory Action dated Oct. 25, 2018 for related U.S. Appl. No. 14/799,437.

Extended European Search Report dated Nov. 20, 2015 for related EP Patent Application No. 15175137.7.

Extended European Search Report dated Dec. 14, 2015 for related EP Patent Application No. 15175135.1.

Joann Spera, "SSL client authentication: It's a matter of trust", Mar. 2, 1998.

Li Wei, "Improvement Method of SSL Protocol Identity Authentication based on the Attribute Certificate", 2012 International Conference on Computer Science and Service System, IEEE Computer Society, Aug. 11, 2012.

Extended European Search Report dated Jan. 4, 2016 for related EP Patent Application No. 151751378.5.

John Padgette, et al., "Guide to Bluetooth Security Recommendations of the National Institute of Standards and Technology", Jun. 2012.

"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.

"Message Sequence Charts, 4 Optional Activities After ACL Connection Establishment, 4.2 Simple Pairing Message Sequence Charts" In: Bluetooth Specification v4.0, Core System Package, Bluetooth.com, vol. 2, Jun. 30, 2010.

"Security Specification" In: Bluetooth Specification v4.0, Core System Package, Bluetooth.com, vol. 2, Jun. 30, 2010.

Extended European Search Report dated Dec. 14, 2015 for related EP Patent Application No. 15175141.9.

Vincent Bernat: "Speeding up SSL: enabling session reuse", Sep. 27, 2011.

Extended European Search Report dated Dec. 23, 2015 for related EP Patent Application No. 15175139.3.

Leicher A et al., "Implementation of a Trusted Ticket System", Emerging Challenges for Security, Privacy and Trust. IFIP Advances in Information and Communication Technology, vol. 297, Jan. 1, 2009.

First Technical Examination and Search Report dated Jan. 25, 2016 for corresponding/related Danish Patent Application No. PA 2015 70437, 5 pages.

Extended European Search Report dated Jan. 11, 2016 for corresponding/related EP Patent Application No. 15175142.7, 10 pages.

(56) References Cited

OTHER PUBLICATIONS

Gary C. Kessler, "An Overview of Cryptography", Nov. 17, 2006.
Menezes et al., "Handbook of Applied Cryptography, Key Management Techniques", Jan. 1, 1997.
First Technical Examination and Search Report dated Feb. 23, 2016 for corresponding/related Danish Patent Application No. PA 2015 70435, 5 pages.
Extended European Search Report dated Jan. 12, 2016 for corresponding/related EP Patent Application No. 15175140.1, 8 pages.
First Technical Examination and Search Report dated Feb. 25, 2016 for corresponding/related Danish Patent Application No. PA 2015 70436.
First Technical Examination and Search Report dated Feb. 25, 2016 for corresponding/related Danish Patent Application No. PA 2015 70434.
First Technical Examination and Search Report dated Feb. 22, 2016 for corresponding/related Danish Patent Application No. PA 2015 70432.
First Technical Examination and Search Report dated Feb. 29, 2016 for corresponding/related Danish Patent Application No. PA 2015 70433.
First Technical Examination and Search Report dated Feb. 25, 2016 for corresponding/related Danish Patent Application No. PA 2015 70438.
Non-final Office Action dated Sep. 22, 2016 for related U.S. Appl. No. 14/793,515.
Non-final Office Action dated Sep. 26, 2016 for related U.S. Appl. No. 14/799,402.
Non-final Office Action dated Sep. 30, 2016 for related U.S. Appl. No. 14/799,437.
Non-final Office action dated Oct. 7, 2016 for related U.S. Appl. No. 14/793,587.
Non-final Office Action dated Feb. 10, 2017 for related U.S. Appl. No. 14/799,463.
Final Office Action dated Mar. 9, 2017 for U.S. Appl. No. 14/793,515.
Final Office Action dated Feb. 17, 2017 for related U.S. Appl. No. 14/799,402.
Notice of Allowance and Fees Due dated May 18, 2017 for related U.S. Appl. No. 14/799,338.
Final Office Action dated May 12, 2017 for related U.S. Appl. No. 14/793,587.
Second Technical Examination and Search Report dated Apr. 5, 2017 for corresponding/related Danish Patent Application No. PA 2015 70432, 3 pages.
Final Office Action dated May 30, 2017 for related U.S. Appl. No. 14/799,437.
Advisory Action dated Jun. 22, 2017 for related U.S. Appl. No. 14/793,515.
Notice of Allowance and Fee(s) due dated Jun. 23, 2017 for related U.S. Appl. No. 14/799,463.
Notice of Allowance and Fee(s) due dated Jul. 11, 2017 for related U.S. Appl. No. 14/799,402.
Notice of Allowance and Fees Due dated Jan. 19, 2017 for related U.S. Appl. No. 14/793,466.
Non-final Office Action dated Jul. 21, 2017 for related U.S. Appl. No. 15/623,266.
Non-final Office Action dated Aug. 14, 2017 for related U.S. Appl. No. 14/793,515.
Notice of Allowance and Fee(s) dated Aug. 24, 2017 for related U.S. Appl. No. 14/799,463.
Notice of Allowance and Fee(s) dated Sep. 13, 2017 for related U.S. Appl. No. 14/799,338.
Second Technical Examination dated Jul. 21, 2017 for corresponding/related Danish Patent Application No. PA 2015 70434, 3 pages.
Non-final Office Action dated Sep. 27, 2017 for related U.S. Appl. No. 15/697,406.
Advisory Action dated Oct. 23, 2017 for related U.S. Appl. No. 14/799,437.
Notice of Allowance and Fee(s) dated Oct. 6, 2017 for related U.S. Appl. No. 14/799,402.
Advisory Action dated Nov. 16, 2017 for related U.S. Appl. No. 14/793,587.
Final Office Action dated Dec. 14, 2017 for related U.S. Appl. No. 15/623,266.
Non-final Office Action dated Dec. 21, 2017 for related U.S. Appl. No. 14/799,437.
Non-final Office Action dated Jan. 26, 2018 for related U.S. Appl. No. 14/799,463.
Non-final Office Action dated Jul. 20, 2017 for related U.S. Appl. No. 15/595,526.
Notice of Allowance and Fee(s) due dated Nov. 3, 2017 for related U.S. Appl. No. 15/595,526.
Advisory Action dated Mar. 7, 2018 for related U.S. Appl. No. 15/623,266.
Communication pursuant to Article 94(3) dated Dec. 8, 2017 for related EP Patent Application No. 15175135.1.
Notice of Allowance dated Mar. 27, 2018 for related U.S. Appl. No. 15/623,266.
Final Office Action dated Apr. 2, 2018 for related U.S. Appl. No. 14/793,515.
Communication pursuant to Article 94(3) dated Jan. 3, 2018 for corresponding EP Patent Application No. 15175141.9.
Non Final Office Action dated May 11, 2018 for related U.S. Appl. No. 15/941,816.

\* cited by examiner

HEARING DEVICE WITH MODEL CONTROL AND ASSOCIATED METHODS

RELATED APPLICATION DATA

This application is a continuation of U.S. patent application Ser. No. 15/595,526, filed on May 15, 2017, pending, which is a continuation of U.S. patent application Ser. No. 14/793,466, filed on Jul. 7, 2015, issued as U.S. Pat. No. 9,729,983, which claims priority to and the benefit of Danish Patent Application No. PA 2015 70433, filed Jul. 2, 2015, pending, and European Patent Application No. 15175137.7, filed Jul. 2, 2015, pending. The entire disclosures of the above applications are expressly incorporated by reference herein.

FIELD

The present disclosure relates to a hearing device with model control and associated methods, and in particular to method of operating a hearing device and method of fitting a hearing device.

BACKGROUND

The developments within the hearing device industry leans towards using the same hardware for different hearing device models with different functionalities, e.g. in order to reduce production costs. Using the same hardware for different models however entails the need for hearing device manufacturers to be able to control and/or authorize the use of different models (software versions) in a selected hearing device.

SUMMARY

There is a need for a hearing device manufacturer to be able to control the configuration of hearing device hardware of a hearing device to operate as different models, e.g. with different software, e.g. in order to secure correct payment for a hearing device.

A hearing device is disclosed, the hearing device comprising a processing unit configured to compensate for hearing loss of a user of the hearing device; and a memory unit. The memory unit has stored therein/comprises a hearing device identifier and model data comprising model information data indicative of available model(s) for the hearing device, the model information data comprising first model information and/or a signature. The processing unit is configured to verify the model data, and proceed to a model update mode if verification of the model data fails.

A method of fitting a hearing device is disclosed. The hearing device comprises a processing unit and a memory unit, wherein the processing unit is configured to compensate for hearing loss of a user of the hearing device. The method comprises obtaining a hearing device identifier of the hearing device, e.g. with a fitting device; obtaining a model name, e.g. with the fitting device; obtaining a model identifier based on the model name and the hearing device identifier from a model identifier generator; and storing, e.g. with the fitting device, the model name and the model identifier in the memory unit.

Further, a method of fitting a hearing device is disclosed, the hearing device comprising a processing unit configured to compensate for hearing loss of a user of the hearing device, a memory unit and an interface, the memory unit having a hearing device identifier stored therein. The method comprises obtaining model data from the hearing device, e.g. with a fitting device; verifying the model data, e.g. with the fitting device; and fitting the hearing device if verification of the model data succeeds. The methods of fitting a hearing device may be performed with a fitting device.

Also a method of operating a hearing device comprising a processing unit configured to compensate for hearing loss of a user of the hearing device, a memory unit and an interface is disclosed. The memory unit/the hearing device has a hearing device identifier and model data comprising model information data indicative of available models for the hearing device stored therein. The model information data comprises first model information and/or a signature. The method comprises verifying the model data, e.g. at start-up; and proceeding to a model update mode if verifying the model data fails.

The disclosed methods and apparatus facilitate that hearing device operation/fitting is authorized/controlled by a hearing device manufacturer. Further, the risk of a dispenser performing unauthorized fitting/model update is heavily reduced.

Advantageously, the present disclosure enables model upgrade/downgrade of a hearing device with proper payment to the hearing device manufacturer. Further, a hearing device manufacturer is able to control/monitor the model settings of a specific hearing device.

Further, the present disclosure enables unauthorized fitting of a hearing device to operate as a non-authorized/unpaid model, e.g. in a case where a dispenser clones/copies model data from another hearing device.

A hearing device includes: a processing unit configured to compensate for hearing loss of a user of the hearing device; and a memory unit; wherein the memory unit has stored therein: a hearing device identifier, and model data comprising model information data indicative of available models for the hearing device, the model information data comprising first model information and a signature; and wherein the processing unit is configured to: verify the model data, and proceed to a model update mode if verification of the model data fails.

Optionally, the processing unit is configured to verify the model data by verifying the signature of the model information data.

Optionally, the model data comprises a model name and/or a model identifier, and wherein the processing unit is configured to verify the model data based on the model name and/or the model identifier.

Optionally, the processing unit is configured to verify the model data by determining if a verification criterion based on the hearing device identifier, the model name, and the model identifier is fulfilled, and wherein verification fails if the verification criterion is not met.

Optionally, the processing unit is configured to verify the model data by performing a check function based on the hearing device identifier, the model name, and the model identifier.

Optionally, the processing unit is also configured to obtain the model information by selecting the model information from available model informations that corresponds to the model name, and to compare a result of the check function with the model information corresponding to the model name.

Optionally, the processing unit is configured to determine that verification of the model data fails if a result of the check function does not match the corresponding model information.

Optionally, the memory unit has a manufacture unit identifier stored therein, and wherein the processing unit is configured to verify the model data based on the manufacture unit identifier.

A method of fitting a hearing device comprising a processing unit and a memory unit, wherein the processing unit is configured to compensate for hearing loss of a user of the hearing device, includes: obtaining a hearing device identifier of the hearing device; obtaining a model name; obtaining a model identifier from a model identifier generator based on the model name and the hearing device identifier; and storing the model name and the model identifier in the memory unit.

Optionally, the method further includes obtaining model information data based on the hearing device identifier and storing the model information data in the memory unit if a first update criterion is met.

A method of fitting a hearing device comprising a processing unit configured to compensate for hearing loss of a user of the hearing device, a memory unit, and an interface, the memory unit having a hearing device identifier stored therein, includes: obtaining model data from the hearing device; verifying the model data; and fitting the hearing device if the act of verifying results in a successful verification of the model data.

A method of operating a hearing device comprising a processing unit configured to compensate for hearing loss of a user of the hearing device, a memory unit, and an interface, the memory unit having a hearing device identifier and model data stored therein, the model data comprising model information data indicative of available models for the hearing device, the model information data comprising first model information and a signature, includes: verifying the model data; and proceeding to a model update mode if the act of verifying the model data results in a failed verification of the model data.

A hearing device includes: a processing unit configured to compensate for hearing loss of a user of the hearing device; and a memory unit, wherein the memory unit is configured to store model data comprising model information data indicative of available models for the hearing device, the model information data comprising first model information; wherein the processing unit is configured to: verify the model data, and reject the model data if verification of the model data fails.

Optionally, the processing unit is configured to verify the model data by verifying a signature of the model information data.

Optionally, the model data comprises a model name and/or a model identifier, and wherein the processing unit is configured to verify the model data based on the model name and/or the model identifier.

Optionally, the processing unit is configured to verify the model data by determining if a verification criterion based on the model name, and the model identifier is fulfilled, and wherein verification fails if the verification criterion is not met.

Optionally, the processing unit is configured to verify the model data by performing a check function based on the model name, and the model identifier.

Optionally, the processing unit is configured to obtain the first model information by selecting the first model information from available model informations that corresponds to the model name, and to compare a result of the check function with the first model information.

Optionally, the processing unit is configured to determine that verification of the model data fails if the result of the check function does not match the first model information.

Optionally, the memory unit has a manufacture unit identifier stored therein, and wherein the processing unit is configured to verify the model data based on the manufacture unit identifier.

A hearing device includes: a processing unit configured to compensate for hearing loss of a user of the hearing device; and a memory unit, wherein the memory unit is configured to store model data comprising a signature; wherein the processing unit is configured to: verify the model data by verifying the signature of the model data, and proceed to a model update mode or to a non-operative mode of the hearing device if verification of the model data fails.

Optionally, the model data also comprises a model name and/or a model identifier, and wherein the processing unit is configured to verify the model data based on the model name and/or the model identifier.

Optionally, the processing unit is configured to verify the model data by determining if a verification criterion based on the model name, and the model identifier is fulfilled, and wherein verification fails if the verification criterion is not met.

Optionally, the processing unit is configured to verify the model data also by performing a check function based on the model name, and the model identifier.

Optionally, the processing unit is also configured to obtain a model information by selecting the model information from available model informations that corresponds to the model name, and to compare a result of the check function with the model information corresponding to the model name.

Optionally, the processing unit is configured to determine that verification of the model data fails if a result of the check function does not match the corresponding model information.

Optionally, the memory unit has a manufacture unit identifier stored therein, and wherein the processing unit is configured to verify the model data based on the manufacture unit identifier.

A hearing device includes: a processing unit configured to compensate for hearing loss of a user of the hearing device; and a memory unit, wherein the memory unit is configured to store model data comprising model information data indicative of available models for the hearing device, the model information data comprising first model information; wherein the processing unit is configured to: verify the model data, and proceed to a non-operative mode of the hearing device if verification of the model data fails.

Optionally, the processing unit is configured to verify the model data by verifying a signature of the model information data.

Optionally, the model data comprises a model name and/or a model identifier, and wherein the processing unit is configured to verify the model data based on the model name and/or the model identifier.

Optionally, the processing unit is configured to verify the model data by determining if a verification criterion based on the model name, and the model identifier is fulfilled, and wherein verification fails if the verification criterion is not met.

Optionally, the processing unit is configured to verify the model data by performing a check function based on the model name, and the model identifier.

Optionally, the processing unit is configured to obtain the first model information by selecting the first model information from available model informations that corresponds to the model name, and to compare a result of the check function with the first model information.

Optionally, the processing unit is configured to determine that verification of the model data fails if the result of the check function does not match the corresponding first model information.

Optionally, the memory unit has a manufacture unit identifier stored therein, and wherein the processing unit is configured to verify the model data based on the manufacture unit identifier.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
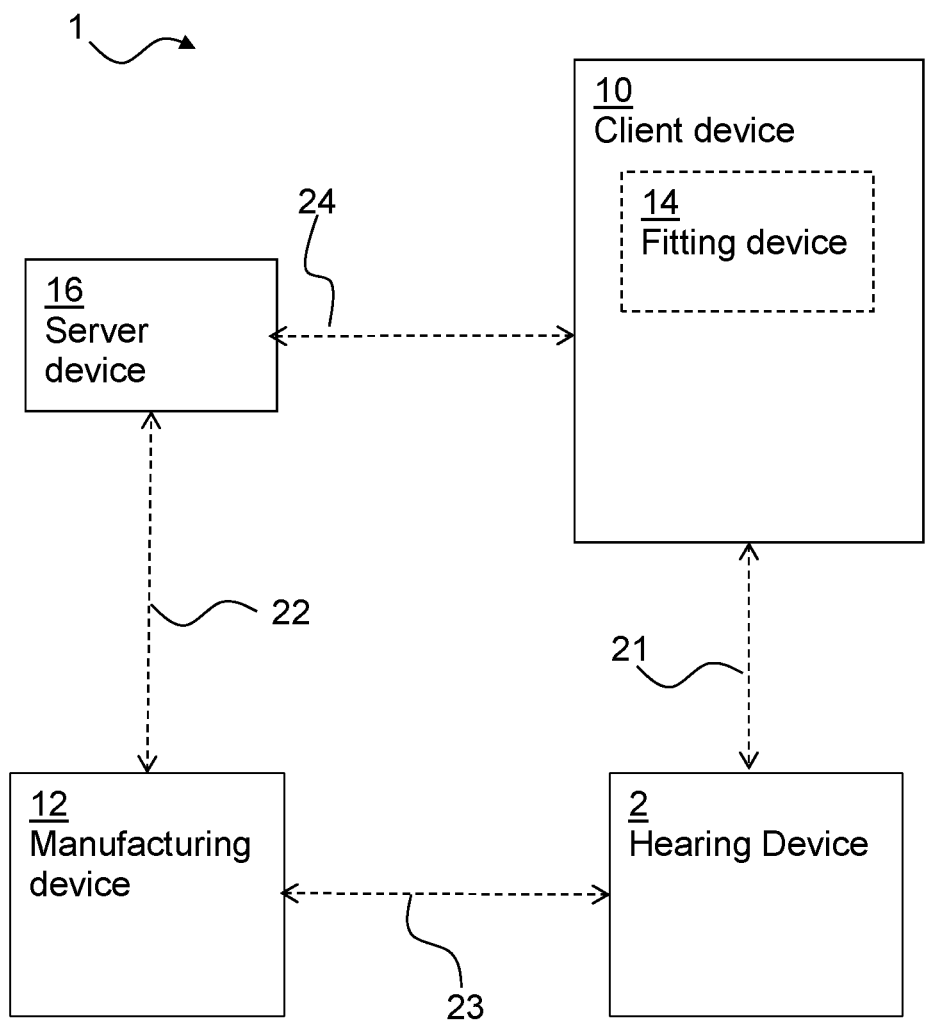
FIG. 1 schematically illustrates an exemplary architecture with a hearing device, FIG. 2 schematically illustrates an exemplary hearing device, FIG. 3 schematically illustrates exemplary model data, FIG. 4 schematically illustrates an exemplary signalling diagram, FIG. 5 schematically illustrates an exemplary signalling diagram, FIG. 6 schematically illustrates a flowchart of an exemplary method, FIG. 7 schematically illustrates a flowchart of an exemplary method, FIG. 8 schematically illustrates a flowchart of an exemplary method, and FIG. 9 schematically illustrates a flowchart of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

The present disclosure relates to improved security of a hearing device. Namely, the hearing device disclosed herein is robust against security threats, vulnerabilities and attacks by implementing appropriate safeguards and countermeasures, such as security mechanisms, to protect against threats and attacks. The present disclosure relates to a hearing device that is robust against unauthorized access/fitting. Further, the hearing device and method(s) facilitate secure and correct model control of different models assignable to a hearing device.

The present disclosure relates to a hearing device. The hearing device comprises a processing unit, a memory unit and optionally an interface. The memory unit may include removable and non-removable data storage units including, but not limited to, Read Only Memory (ROM), Random Access Memory (RAM), hardware register(s), e.g. hardware registers of transceiver/radio and/or processing unit etc. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device or a hearing device, respectively comprising a wireless transceiver configured to receive and/or transmit data.

The hearing device/memory unit may have a hearing device identifier stored therein. The hearing device identifier may refer to a unique identifier of the hearing device. As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, unit, with a length of e.g. 8 bits, 16 bits, 32 bits, etc., such as an array of unsigned integers.

The hearing device/memory unit has model data stored therein or is configured for storing model data therein. The model data comprises model information data indicative of available models of the hearing device, e.g. including a first model and/or a second model with features different from the features of the first model. For example, a first model may be able to wirelessly communicate with another hearing device, e.g. to form a binaural hearing system, while a second model is not able to communicate with another hearing device and thus intended to form a hearing system with a single hearing device. The model information data may be specific/unique for the hearing device, e.g. the model information data may be based on the hearing device identifier. Model information data may be stored in the memory unit during manufacture and/or during a fitting session at a dispenser. The model information data may comprise first model information. The first model information is indicative of a model which the respective hearing device may be configured to operate as. The model information data is indicative of one or more models which the respective hearing device may be configured to operate as. The model information data may comprise second model information indicative of a model which the respective hearing device may be configured to operate as.

The model information data may comprise a (digital) signature, so that a fitting device is able to verify or authenticate the model information data content and origin. The digital signature enables a proof or verification of authenticity of the model information data, such as verification of the signer legitimacy. The digital signature is optionally generated by a manufacturing device using a model information private key upon manufacturing of the hearing device. The hearing device and/or a fitting device may be configured to verify the digital signature. The digital signature is verifiable by the hearing device/fitting device using a corresponding model information public key. If the digital signature is not successfully verified using the alleged public key, verification of the model data fails. This may provide the advantage that the hearing device rejects model information data that is tampered or received from unauthenticated parties. Model information data may thus be robust against impersonation, modification and masquerading attacks.

The model data may comprise a model name. The model name is indicative of the model of the hearing device. The model name may thus be indicative of the model which the hearing device is configured to operate as. As used herein the term "model name" refers to a piece of data that is used for identifying, such as for categorizing, and/or uniquely identifying a hearing device model. The model name may be in a form of a word, a number, a letter, a symbol, a list, an array or any combination thereof. For example, the model name as a number may be in the form of an integer, such as unsigned integer, unit, with a length of e.g. 8 bits, 16 bits, 32 bits, etc., such as an array of unsigned integers.

The model data may comprise a model identifier. The model identifier may be based on the model name and/or the hearing device identifier. The model identifier may refer to a unique identifier of a hearing device model of a specific hearing device, e.g. the model identifier for a first hearing device configured as a first model may be different from the model identifier for a second hearing device configured as the first model, and/or the model identifier for a first hearing device configured as a first model may be different from the model identifier for the first hearing device configured as a second model.

The hearing device/memory unit may have a manufacture unit identifier stored therein. The manufacture unit identifier is optionally indicative of the manufacture unit used in manufacture or generation of the model information data and/or model identifier.

The processing unit is configured to verify the model data. To verify the model data may be based on the model name and/or the model identifier.

To verify the model data and/or verifying the model data may comprise to determine if a verification criterion based on the hearing device identifier, the model name and/or the model identifier is fulfilled, wherein verification fails if the verification criterion is not met. The verification criterion may be based on the model information data. To determine if a verification criterion is fulfilled may comprise calculating one or more hash functions. By verifying the model data based on the hearing device identifier, a hearing device manufacturer is able to control available models for a specific hearing device, i.e. the model information data is based on the hearing device identifier.

To determine if a verification criterion is fulfilled may comprise to compare model information data, e.g. as indicated by the model name, with the result of a hash function, e.g. SHA-2, applied to the hearing device identifier, the model name and/or the model identifier.

In one or more exemplary hearing devices and/or method(s), if the model name is indicative of or points to first model information of the model information data, the verification criterion may be fulfilled or at least partly fulfilled if $MI_1 = \text{hash}(HD\_ID, M\_N, M\_ID)$, where $MI_1$ is the first model information, hash is a hash function, such as SHA-2, HD_ID is the hearing device identifier, M_N is the model name and M_ID is the model identifier stored in the memory unit. Optionally, a manufacture unit identifier, MU_ID, may be included in the hash function.

In one or more exemplary hearing devices, if the model name is indicative of or points to second model information of the model information data, the verification criterion may be fulfilled or at least partly fulfilled if $MI_2 = \text{hash}(HD\_ID, M\_N, M\_ID, MU\_ID)$, where $MI_2$ is the second model information, hash is a hash function, such as SHA-2, HD_ID is the hearing device identifier, M_N is the model name, M_ID is the model identifier, and MU_ID is manufacture unit identifier stored in the memory unit.

In one or more exemplary hearing devices and/or method(s), the verification criterion may be fulfilled or at least partly fulfilled if:

$MI_i = \text{hash}(HD\_ID, M\_N, M\_ID, MU\_ID)$ for one of $i=1,2,\ldots n$, wherein $MI_i$ is the i'th model information for the n different models included in the model information data, hash is a hash function, such as SHA-2, HD_ID is the hearing device identifier, M_N is the model name, M_ID is the model identifier, and MU_ID is manufacture unit identifier stored in the memory unit.

In one or more exemplary hearing devices and/or method(s), the verification criterion may be fulfilled or at least partly fulfilled if:

$MI_i = \text{hash}(HD\_ID, M\_N, M\_ID, MU\_ID)$, wherein $MI_i$ is the model information for the i'th model indicated by the model name and included in the model information data, hash is a hash function, such as SHA-2, HD_ID is the hearing device identifier, M_N is the model name, M_ID is the model identifier, and MU_ID is manufacture unit identifier stored in the memory unit.

To verify the model data and/or verifying the model data may comprise to perform a check function based on the hearing device identifier, the model name and/or the model identifier. To perform the check function may comprise to apply one or more hash functions. To verify the model data and/or verifying the model data may comprise to select model information corresponding to the model name. To verify the model data and/or verifying the model data may comprise to compare the result of the check function with the model information data, such as first model information and/or second model information. To verify the model data and/or verifying the model data may comprise to compare the result of the check function with the model information corresponding to the model name or all the model information of the model information data. Verification of the model data may fail if the result of the check function does not match the corresponding model information. Verification of the model data may fail if the result of the check function does not match any model information of the model information data.

To verify the model data and/or verifying the model data may comprise to perform a check function based on the manufacture unit identifier.

The processing unit is configured to proceed to a model update mode if verification of the model data fails. In the model update mode, the hearing device may be non-operative and/or send an acoustic signal indicative of the hearing device being in model update mode.

In one or more exemplary methods of fitting a hearing device, the method comprises obtaining a hearing device identifier of the hearing device. Obtaining a hearing device identifier may comprise receiving, e.g. in a fitting device, the hearing device identifier from the memory unit of the hearing device.

In one or more exemplary methods of fitting a hearing device, the method comprises obtaining a model name, e.g. with a fitting device. Obtaining a model name may comprise receiving user input with a fitting device, the user input being indicative of model name. In one or more exemplary methods of fitting a hearing device, the method comprises obtaining model information data from the hearing device and/or determining if model information data is present.

The method may comprise obtaining a model identifier based on the model name and the hearing device identifier from a model identifier generator. Obtaining a model identifier may comprise transmitting a model identifier request comprising the model name and the hearing device identifier to the model identifier generator, and receiving a model identifier response comprising the model identifier from the model identifier generator. The model identifier generator may be a server device controlled by the hearing device manufacturer. The model identifier generator is a device configured to generate the model identifier, such as a manufacturing device, e.g. an integrated circuit card, a smart card, a hardware security module.

The method may comprise storing the model name and the model identifier in the memory unit of the hearing device.

The method may comprise obtaining model information data, e.g. from a server device/model identifier generator, based on the hearing device identifier and storing the model information data in the memory unit, e.g. if a first update criterion is met. The first update criterion may be met if the memory unit of the hearing device does not contain model information data or if the model information data are corrupted, e.g. if the signature is not verified. The first update criterion may be met if the model information data does not contain model information corresponding to the obtained model name. Obtaining model information data may comprise transmitting a model information data request comprising the hearing device identifier and/or the obtained model name, e.g. to a model information data generator, and receiving a model information data response comprising the model information data from the model information data generator. The model information data generator may be a server device controlled by the hearing device manufacturer. The model information data generator is a device configured to generate the model information data, such as a manufacturing device, e.g. an integrated circuit card, a smart card, a hardware security module.

In one or more exemplary methods, obtaining a model identifier and storing the model name and the model identifier is performed if a second update criterion is met. The second update criterion may be met if the memory unit of the hearing device does not contain a model identifier, e.g. if model identifier is a default value, such as zero. The second update criterion may be met if a model name of the memory unit is different from the obtained model name.

The method may comprise retrieving model data, such as model name, model identifier and/or model information data from the memory unit; verifying the model data, optionally including verifying a signature of the model information data, verifying the model name and the model identifier based on the model information data and the hearing device identifier; and aborting fitting if verifying the model data, e.g. verifying the signature, the model name or the model identifier, fails.

The method may comprise fitting hearing device parameters according to the model name, e.g. if verifying the signature, the model name and the model identifier succeeds, i.e. the signature, the model name and the model identifier are verified.

In the method of operating a hearing device, verifying the model data may comprise verifying the signature of the model information data. In the method of operating a hearing device, the model data may comprise a model name and/or a model identifier, and verifying the model data may comprise verifying the model data based on the model name and/or the model identifier.

FIG. 1 schematically illustrates exemplary devices that may be used for manufacturing, maintenance/update of, and/or operating a hearing device 2. FIG. 1 shows an exemplary system 1 and a hearing device 2. The system 1 may comprise one or more of a manufacturing device 12, a client device 10 and/or fitting device 14, and a server device 16 for manufacturing, maintenance/update of, and/or operating the hearing device 2 optionally including but not limited to configuration of a hearing device to operate as a desired hearing device model. The manufacturing device 12 may be configured to store a hearing device identifier in the hearing device 2. The manufacturing device 12 and/or the fitting device 14 may be configured to store model data in the hearing device 2. The manufacturing device 12 and/or the fitting device 14 may be configured to store a model name and/or a model identifier based on the model name and the hearing device identifier in the hearing device 2. The hearing device 2 may be configured to compensate for hearing loss of a user of the hearing device 2. The hearing device 2 may be configured to communicate with the manufacturing device 12 using e.g. a communication link 23, such as a uni or bi-directional communication link. The communication link 23 may be a wired link and/or wireless communication link. The communication link 23 may be a single hop communication link or a multi-hop communication link. The wireless communication link may be carried over a short-range communication system, such as Bluetooth, Bluetooth low energy, IEEE 802.11, Zigbee. The hearing device 2 may be configured to receive model data from the manufacturing device 12 and to store the model data in the memory unit comprised in the hearing device 2, e.g. as part of primary security settings. Alternatively or additionally, the manufacturing device 12 may store the model data directly in the memory unit of the hearing device. For example, the manufacturing device 12 may write the model data in the memory unit. For example, during manufacturing of the hearing device 2, the manufacturing device 12 connects to the hearing device 2 and transmits the model to the hearing device 2. The hearing device may receive and store the model data. The hearing device 2 may then use the material provided in the model data to secure authorized operation of the hearing device. The hearing device 2 may be configured to connect to the client device 10/fitting device 14 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as Bluetooth, Bluetooth low energy, IEEE 802.11, Zigbee. The hearing device 2 may configured to connect to the client device 10/fitting device 14 over a network. The client device 10 may permit remote fitting of the hearing aid device where a dispenser connects to the hearing device via the client device 10 of the user. The client device 10 may comprise a computing device acting as a client, such as a fitting device 14 (e.g. a handheld device, a relay, a tablet, a personal computer, a mobile phone, and/or USB dongle plugged in a personal computer). The client device 10/fitting device 14 may be configured to communicate with the server device 16 (model identifier generator) via a communication link 24, such as a bidirectional communication link. The communication link 24 may be a wired link and/or wireless communication link. The communication link 24 may comprise a network, such as the Internet. The client device 10/fitting device 14 may be configured to communicate with the server device 16 for maintenance, and update purposes. The server device 16 (model identifier generator) may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
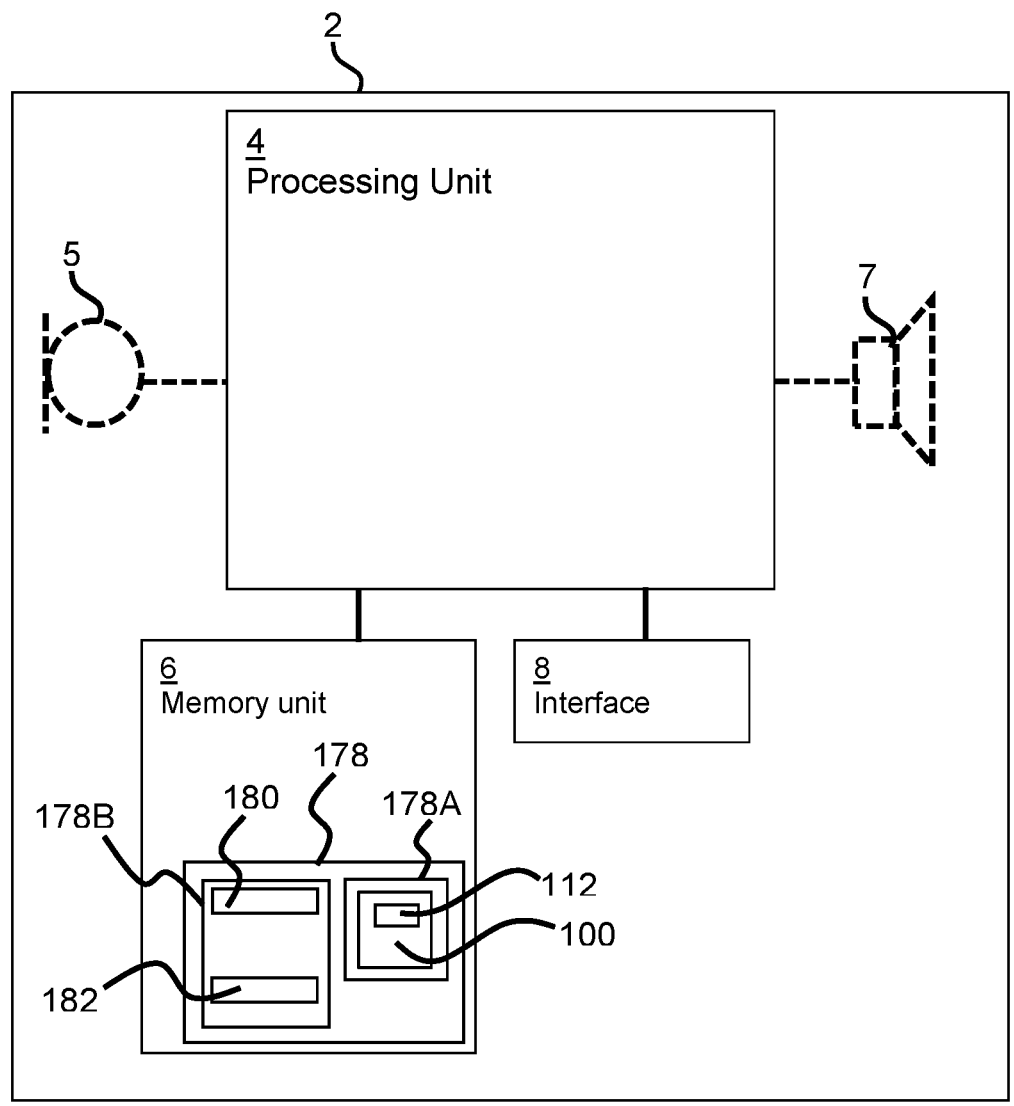

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 optionally comprises a wireless transceiver, e.g. configured for wireless communication at frequencies in the range from 2.4 to 2.5 GHz. The interface 8 is configured for communication, such as wired and/or wireless communication, with a manufacturing device 12 and/or a client device 10/fitting device 14. The processing unit 4 may be configured to compensate for hearing loss of a user of the hearing aid according to data received during manufacture and/or fitting. The hearing device 2 optionally comprises a microphone 5 or a plurality of microphones for receiving sound signal(s) and converting sound signal(s) into converted sound signal(s). In one or more exemplary hearing devices, a wireless transceiver of the interface may also provide one or more converted sound signal(s), e.g. from an external sound source such as a mobile phone or sound system with wireless transmitter, to the processing unit. The converted sound signal(s) may be an electrical and/or digital version of the sound signal. The processing unit 4 is configured to receive and process the converted sound signal(s) into a processed sound signal according to a hearing loss of a user of the hearing device 2. The processed sound signal may be compressed and/or amplified or the like. The hearing device 2 comprises an output transducer/loudspeaker 7, known as a receiver. The receiver 7 is configured to receive the processed sound signal and convert the processed sound signal to an output sound signal for reception by an eardrum of the user. The hearing device is optionally configured to operate according to security settings 178 of the hearing device. The security settings 178 may comprise primary security settings 178A optionally comprising a hearing device certificate 100. In one or more exemplary hearing devices, the hearing device certificate 100/security settings 178 comprise hearing device identifier 112 and/or a digital signature to enable verification of the content of the hearing device certificate. The hearing device certificate 100 may comprise keying material for securing communication with e.g. client device 10/fitting device 14. Optionally, the security settings 178 comprises secondary security settings 178B, e.g. including one or more operational parameters of the hearing device. The model name and/or model identifier may be stored in/form part of the primary security settings and/or the secondary security settings. The memory unit 6 may include removable and non-removable data storage units including, but not limited to, Read Only Memory (ROM), Random Access Memory (RAM), etc. The memory unit 6 has stored therein or is at least configured to store a hearing device identifier 112, e.g. as part of the primary security settings 178A/hearing device certificate 100. The memory unit 6 has stored therein or is at least configured to store model data 180, e.g. as part of security settings 178. The model data 180 comprises model information data indicative of one or more available models for the hearing device, wherein the model information data comprises first model information and a (digital) signature.

The model data 180 comprises a model name and/or a model identifier, and the processing unit 4 is configured to verify the model data based on the model name and/or the model identifier. The model name and/or model identifier may be stored in the memory unit 6 during fitting of the hearing device, i.e. at the dispenser using a fitting device. A default model name and a default model identifier according to the default model name and the hearing device identifier may be stored in the memory unit during manufacture. Subsequently, the model name and the model identifier may be updated during fitting, e.g. using method(s) as described herein. Optionally, the memory unit 6 has stored therein or is at least configured to store a manufacture unit identifier 182 indicative of the manufacture unit used for manufacture of the hearing device.

The processing unit 4 is configured to verify the model data 180 based on one or more of the model information data, e.g. first model information and/or digital signature, the model name, the model identifier and the manufacture unit identifier 182. The processing unit is configured to proceed to a model update mode if verification of the model data fails. The model update mode may be a non-operative mode, i.e. where the hearing device does not operate as a hearing device.

The processing unit 4 is configured to verify the digital signature of the model information data and check/verify that a verification criterion is fulfilled. The model data are then verified or at least partly verified if the digital signature of the model information data is verified and the verification criterion is met. In one or more exemplary hearing devices, the verification criterion is met if $MI_i$=hash(HD_ID, M_N, M_ID, MU_ID) for one of i=1, 2, . . . n, wherein $MI_i$ is the i'th model information for the n different models included in the model information data, hash is a hash function, such as SHA-2, HD_ID is the hearing device identifier, M_N is the model name, M_ID is the model identifier, and MU_ID is manufacture unit identifier stored in the memory unit. In one or more exemplary hearing devices, the verification criterion is met if $MI_i$=hash(HD_ID, M_N, M_ID, MU_ID), wherein $MI_i$ is the i'th model information for the i'th model indicated by the model name.

Figure 3:
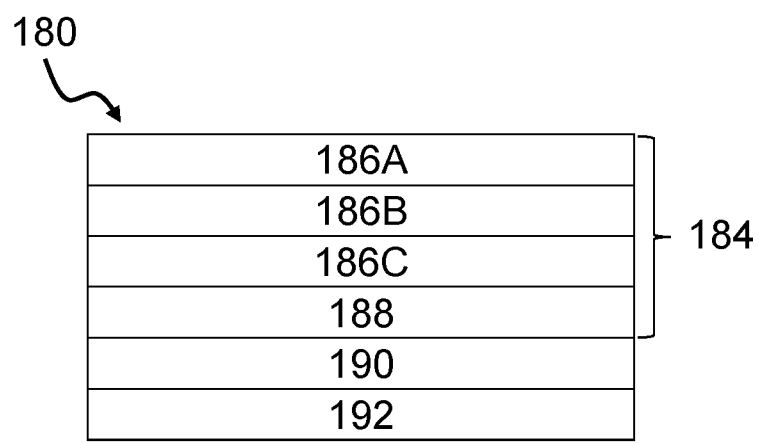

FIG. 3 schematically illustrates exemplary model data 180 of a hearing device/stored in a hearing device. The model data 180 comprises model information data 184 comprising model information 186A, 186B, 186C for three different models. The model information 186A, 186B, 186C is unique for the respective hearing device since it is based on the hearing device identifier. Further, the model data 180 comprises or is configured to comprise model name 190 and model identifier 192. The model identifier 192 is based on the hearing device identifier, the model name 190, and a model information private key of the hearing device manufacturer, e.g. given as:

$$M\_ID=hash(HD\_ID, M\_N, MI\_PK),$$

where M_ID is the model identifier, hash is a hash function, HD_ID is the hearing device identifier, M_N is the model name and MI_PK is the model information private key, e.g. held by a model identifier generator. The model name and the model identifier may be assigned to the hearing device during fitting, e.g. using a method as described herein or during manufacture.

Figure 4:
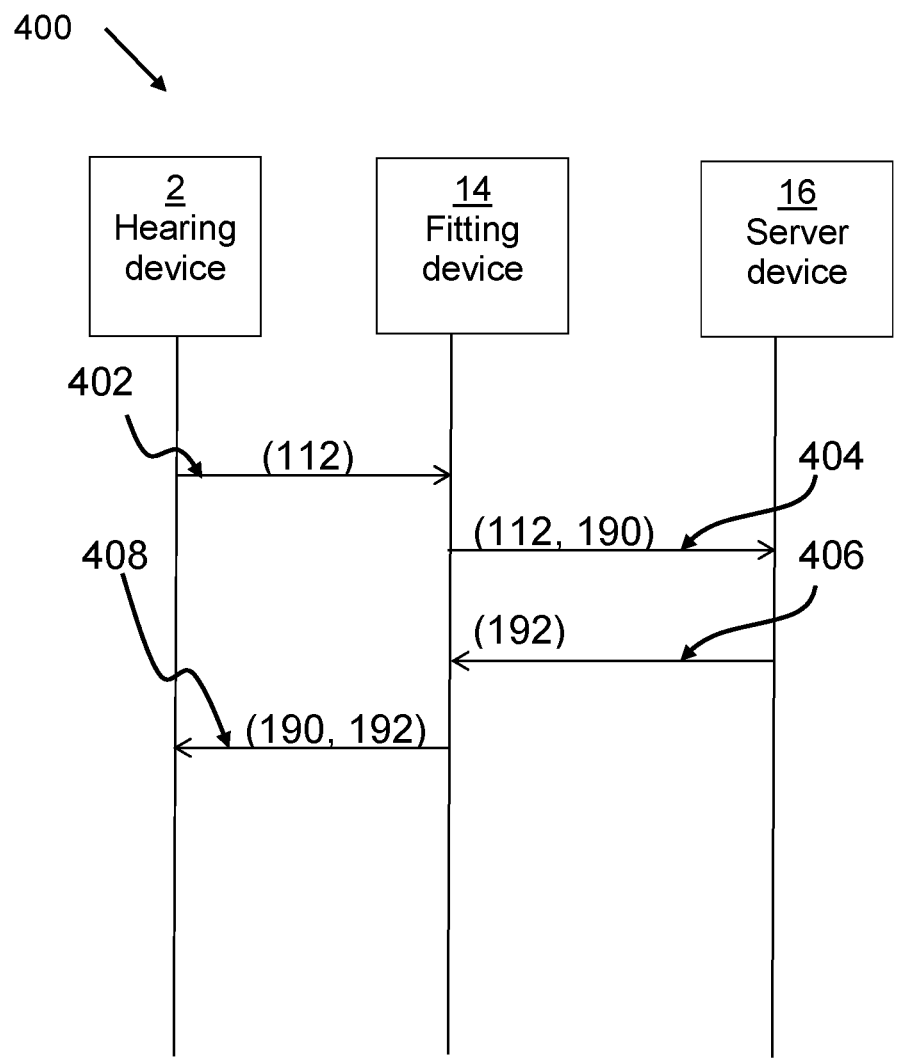

FIG. 4 is an exemplary signalling diagram 400 illustrating an exemplary method of wirelessly fitting a hearing device. Fitting device 14 obtains hearing device identifier 112 by receiving a HD_ID message 402 including the hearing device identifier 112 from hearing device 2. The fitting device 14 obtains a model name from a user interface of the fitting device by a dispenser/user indicating the desired model name of the hearing device and obtains a model identifier 192 by transmitting a M_ID request 404 including hearing device identifier 112 and model name 190 or data indicative thereof to server device 16 acting as model identifier generator. The model identifier generator generates model identifier 192 to the fitting device based on the hearing device identifier, the model name 190, and a model information private key of the hearing device manufacturer and transmits model identifier 192 in a model identifier response 406. Thereby, the manufacturer is able to control which hearing devices are operating which models and to prevent cloning of a hearing device model for one hearing device to other devices. The model name 190 and the model identifier 192 are then stored in the hearing device 2 by sending an update request 408 including the model name 190 and the model identifier 192 to the hearing device 2.

Figure 5:
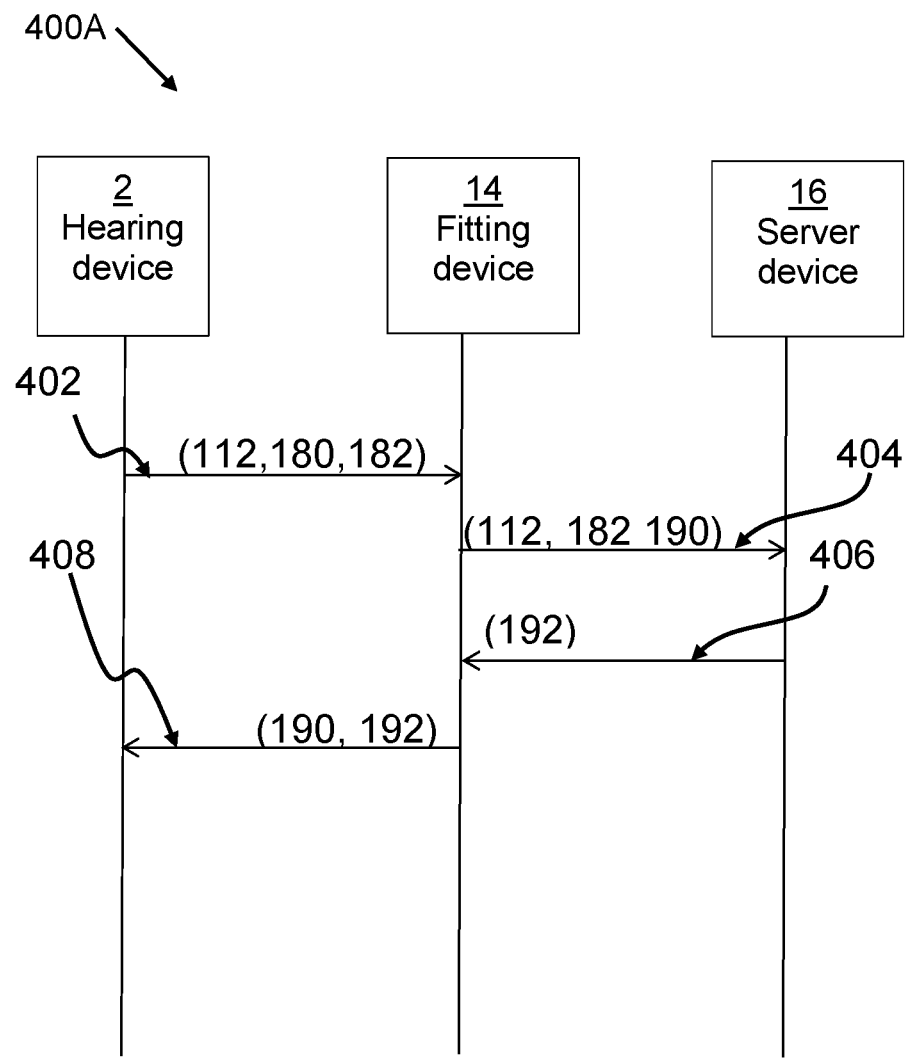

FIG. 5 is an exemplary signalling diagram 400A illustrating an exemplary method of wirelessly fitting a hearing device. The method comprises obtaining, with the fitting device 14, model data 180 and/or manufacture unit identifier 182, e.g. by including the model data 180 and/or manufacture unit identifier 182 in the hearing device identifier message 402. Thereby a fitting device 14 is able to determine if an update of the model data, such as model information data, model name and/or model identifier is necessary.

Figure 6:
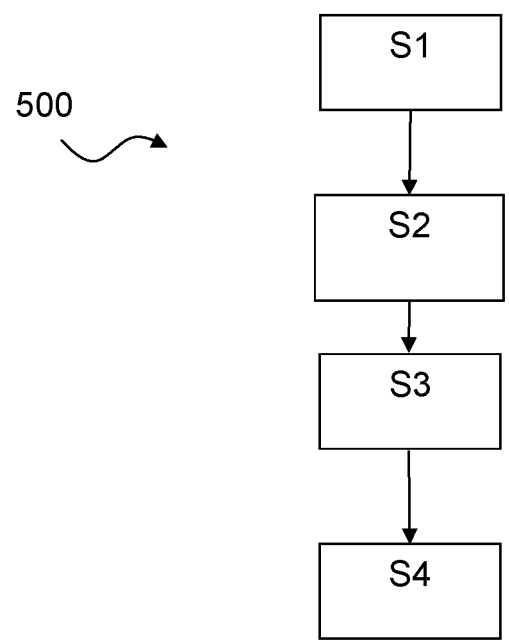

FIG. 6 illustrates a flowchart of an exemplary method of fitting a hearing device comprising a processing unit and a memory unit, wherein the processing unit is configured to compensate for hearing loss of a user of the hearing device. The method 500 comprises obtaining S1 a hearing device identifier of the hearing device and obtaining S2 a model name, e.g. from a user interface of a fitting device. Obtaining S1 a hearing device identifier of the hearing device optionally comprises receiving the hearing device identifier from the hearing device, e.g. via a wireless connection. The method proceeds to obtaining S3 a model identifier based on the model name and the hearing device identifier from a model identifier generator; and storing S4 the model name and the model identifier in the memory unit of the hearing device.

Figure 7:
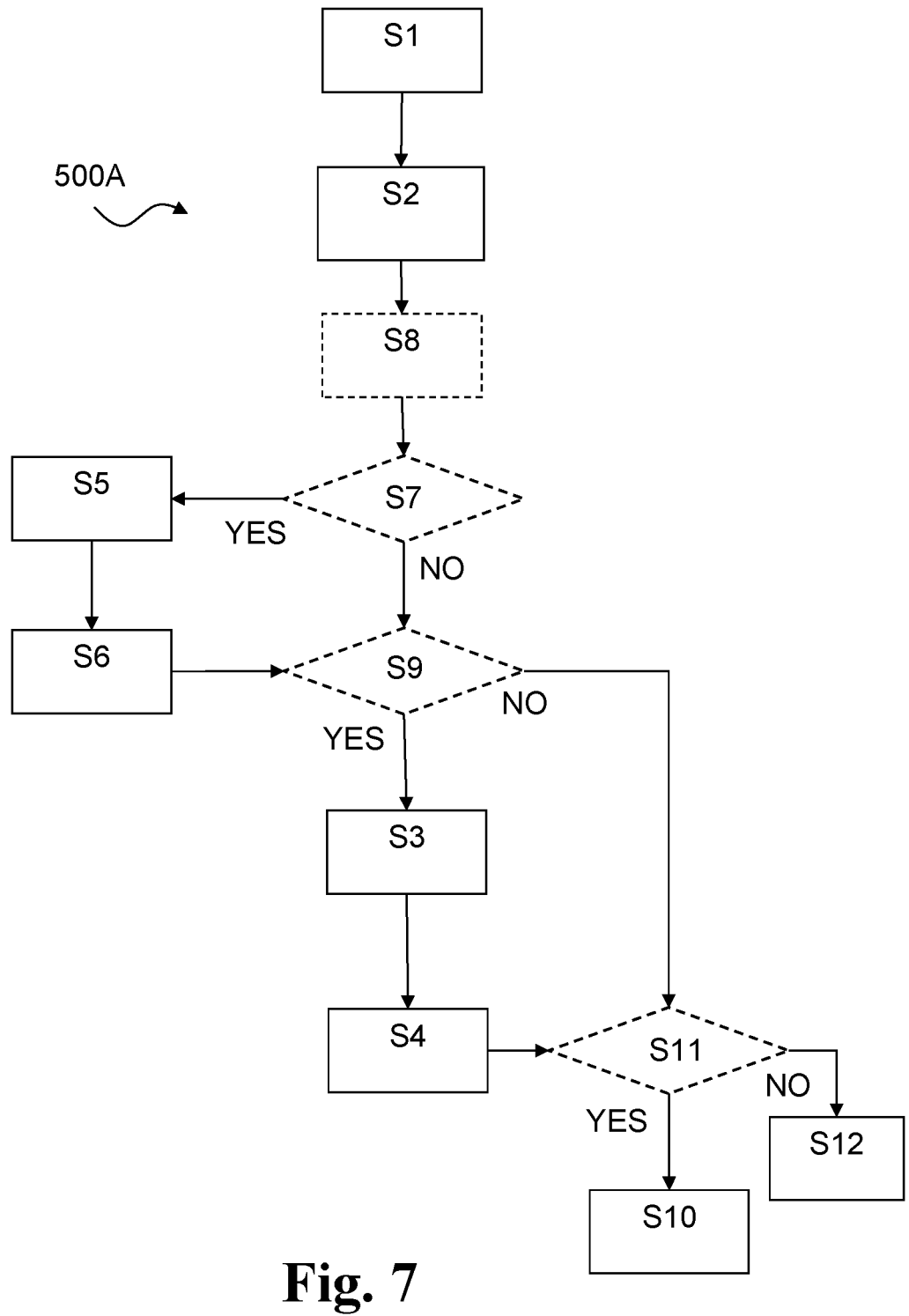

FIG. 7 illustrates a flowchart of an exemplary method of fitting a hearing device comprising a processing unit and a memory unit, wherein the processing unit is configured to compensate for hearing loss of a user of the hearing device. Optionally, the method 500A comprises obtaining S5 model information data based on the hearing device identifier, e.g. from a server device/model identifier generator and storing S6 the model information data in the memory unit if a first update criterion S7 is met. The method 500A may comprise obtaining S8 model data including model information data from the hearing device. The first update criterion S7 may be met if the hearing device does not contain model information data, such as first model information or signature, or the digital signature of the model information data cannot be verified/is not valid. In the method 500A, obtaining S3 a model identifier and storing S4 the model name and the model identifier is performed if a second update criterion S9 is met. The second update criterion S9 may be met if the model name obtained in S2 differs from the model name of model data obtained from the hearing device in S8. The second update criterion S9 may be met if model identifier of model data obtained from the hearing device in S8 is not present or has a default value, such as zero. If the second update criterion S9 is not met, the method proceeds to fitting S10 hearing device parameters according to the model name either directly or if the model data of the memory unit are optionally verified in S11. The method optionally comprises aborting S12 fitting if verifying S11 the model data, such as the signature, the model name or the model identifier fails.

Figure 8:
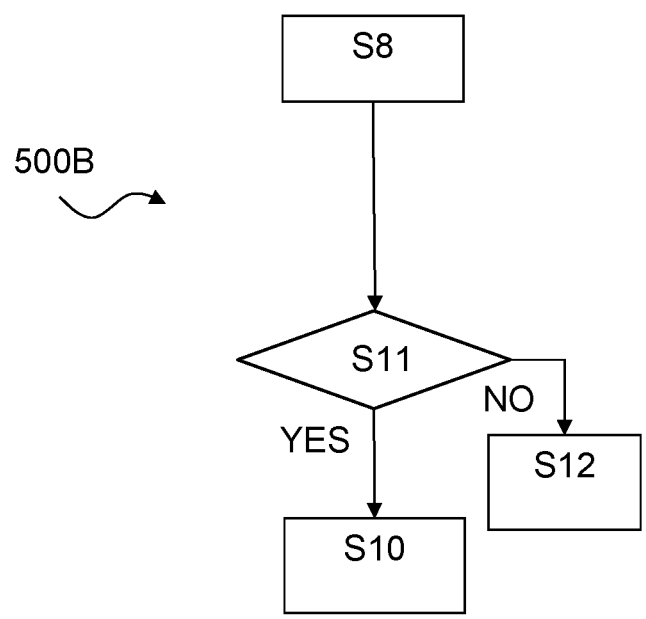

FIG. 8 illustrates a flowchart of an exemplary method of fitting a hearing device comprising a processing unit configured to compensate for hearing loss of a user of the hearing device, a memory unit and optionally an interface, the memory unit having a hearing device identifier stored therein. The method 500B comprises obtaining S8 model data from the hearing device and verifying S11 the model data. If verification of the model data succeeds in S11, the method 500B proceeds to fitting S10 the hearing device. If verification of the model data fails in S11, the method 500B optionally proceeds to aborting S12 fitting of the hearing device.

Figure 9:
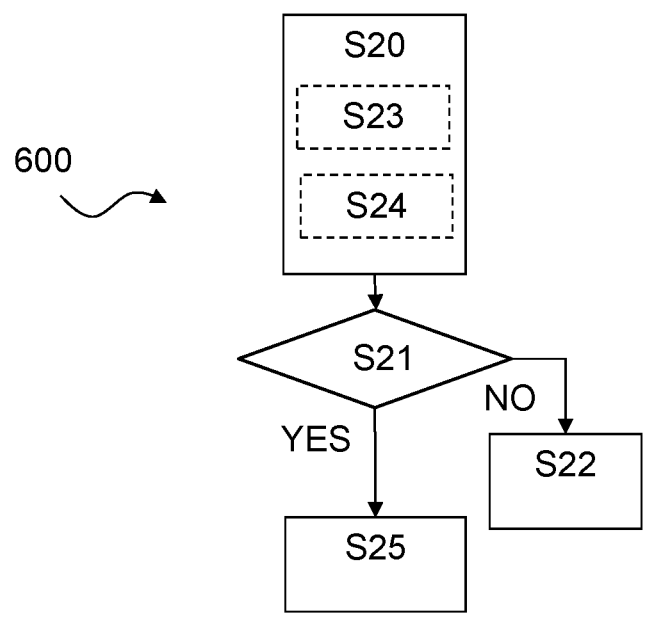

FIG. 9 illustrates a flowchart of an exemplary method of operating a hearing device comprising a processing unit configured to compensate for hearing loss of a user of the hearing device, a memory unit and an interface, the memory unit having a hearing device identifier and model data comprising model information data indicative of available models for the hearing device stored therein, the model information data comprising first model information and a signature. The method 600 comprises verifying S20 the model data. If verifying S20 the model data fails (no verification) as determined in S21, the method comprises proceeding S22 to a model update mode. Verifying S20 the model data comprises verifying S23 the signature of the model information data and verifying S24 the model data based on model name and/or model identifier of the model data. The method proceeds to normal operation S25 if verifying S20 the model data succeeds.

Exemplary hearing devices and methods are set out in the following items.

Item 1. A hearing device comprising
a processing unit configured to compensate for hearing loss of a user of the hearing device; and
a memory unit,
wherein the memory unit has stored therein:
a hearing device identifier; and
model data comprising model information data indicative of available models for the hearing device, the model information data comprising first model information and a signature, and
wherein the processing unit is configured to:
verify the model data, and
proceed to a model update mode if verification of the model data fails.

Item 2. Hearing device according to item 1, wherein to verify the model data comprises to verify the signature of the model information data.

Item 3. Hearing device according to any of items 1-2, wherein the model data comprises a model name and/or a model identifier, and wherein to verify the model data is based on the model name and/or the model identifier.

Item 4. Hearing device according to item 3, wherein to verify the model data comprises to determine if a verification criterion based on the hearing device identifier, the model name and the model identifier is fulfilled, wherein verification fails if the verification criterion is not met.

Item 5. Hearing device according to any of items 3-4, wherein to verify the model data comprises to perform a check function based on the hearing device identifier, the model name and the model identifier, to select model information corresponding to the model name and to compare the result of the check function with the model information corresponding to the model name, and wherein verification of the model data fails if the result of the check function does not match the corresponding model information.

Item 6. Hearing device according to any of items 1-5, wherein the memory unit has a manufacture unit identifier stored therein, and wherein to verify the model data is based on the manufacture unit identifier.

Item 7. Method of fitting a hearing device comprising a processing unit and a memory unit, wherein the processing unit is configured to compensate for hearing loss of a user of the hearing device, the method comprising
- obtaining a hearing device identifier of the hearing device;
- obtaining a model name;
- obtaining a model identifier based on the model name and the hearing device identifier from a model identifier generator; and
- storing the model name and the model identifier in the memory unit.

Item 8. Method according to item 7, wherein the method comprises obtaining model information data based on the hearing device identifier and storing the model information data in the memory unit if a first update criterion is met.

Item 9. Method according to any of items 7-8, wherein obtaining a model identifier and storing the model name and the model identifier is performed if a second update criterion is met.

Item 10. Method according to any of items 7-9, wherein the method comprises retrieving model name, model identifier and model information data from the memory unit; verifying a signature of the model information data, verifying the model name and the model identifier based on the model information data and the hearing device identifier; and aborting fitting if verifying the signature, the model name or the model identifier fails.

Item 11. Method according to any of items 7-10, the method comprising fitting hearing device parameters according to the model name.

Item 12. Method of fitting a hearing device comprising a processing unit configured to compensate for hearing loss of a user of the hearing device, a memory unit and an interface, the memory unit having a hearing device identifier stored therein, the method comprising
- obtaining model data from the hearing device;
- verifying the model data; and
- fitting the hearing device if verification of the model data succeeds.

Item 13. Method of operating a hearing device comprising a processing unit configured to compensate for hearing loss of a user of the hearing device, a memory unit and an interface, the memory unit having a hearing device identifier and model data comprising model information data indicative of available models for the hearing device stored therein, the model information data comprising first model information and a signature, wherein the method comprises
- verifying the model data; and
- proceeding to a model update mode if verifying the model data fails.

Item 14. Method according to item 13, wherein verifying the model data comprises verifying the signature of the model information data.

Item 15. Method according to any of items 13-14, wherein the model data comprises a model name and/or a model identifier, and wherein verifying the model data comprises verifying the model data based on the model name and/or the model identifier.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 1 system
2 hearing device
4 processing unit
5 microphone
6 memory unit
7 receiver
8 interface
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
112 hearing device identifier
178 security settings
178A primary security settings
178B secondary security settings
180 model data
182 manufacture unit identifier
184 model information data
186A first model information
186B second model information
186C third model information
188 digital signature
190 model name
192 model identifier
400, 400A signalling diagram
402 hearing device identifier message
404 model identifier request
406 model identifier response
408 update request
500, 500A, 500B method of fitting a hearing device
600 method of operating a hearing device

The invention claimed is:
1. A hearing device comprising:
a processing unit configured to compensate for hearing loss of a user of the hearing device;
and a memory unit, wherein the memory unit is configured to store model data that is associated with a model and/or a functionality of the hearing device;

wherein the processing unit is configured to:
perform a verification based on the model data, and
allow the hearing device to be set if the verification performed based on the model data succeeds.

2. The hearing device according to claim 1, wherein the processing unit is configured to allow the hearing device to be set by receiving fitting data to configure the hearing device.

3. The hearing device according to claim 1, wherein the processing unit is configured to change the model data in response to a signal transmitted by an external device.

4. The hearing device according to claim 1, wherein the processing unit is configured to change the model data in response to a change in the functionality of the hearing device.

5. The hearing device according to claim 1, wherein the processing unit is configured to perform the verification by verifying the model data.

6. The hearing device according to claim 5, wherein the processing unit is configured to verify the model data by verifying a signature.

7. The hearing device according to claim 6, wherein the signature is that of the model data.

8. The hearing device according to claim 1, wherein the model data comprises a model name and/or a model identifier, and wherein the processing unit is configured to perform the verification based on the model name and/or the model identifier.

9. The hearing device according to claim 8, wherein the processing unit is configured to perform the verification by determining if a verification criterion based on the model name and/or the model identifier is fulfilled, and wherein verification fails if the verification criterion is not met.

10. The hearing device according to claim 8, wherein the processing unit is configured to perform the verification by performing a check function based on the model name and/or the model identifier.

11. The hearing device according to claim 10, wherein the processing unit is configured to obtain model information by selecting the model information from available model information that corresponds to the model name and/or the model identifier, and to compare a result of the check function with the selected model information.

12. The hearing device according to claim 10, wherein the processing unit is configured to determine that the verification fails if a result of the check function does not match a corresponding model information.

13. The hearing device according to claim 1, wherein the memory unit has a manufacture unit identifier stored therein, and wherein the processing unit is configured to perform the verification also based on the manufacture unit identifier.

14. The hearing device according to claim 1, wherein the processing unit is configured to proceed to a model update mode or a non-operative mode of the hearing device if the verification fails.

15. A hearing device comprising:
a processing unit configured to compensate for hearing loss of a user of the hearing device;
and a memory unit, wherein the memory unit is configured to store model data that is associated with a model or a functionality of the hearing device;
wherein the processing unit is configured to:
obtain a result of a verification performed based on the model data, and
allow the hearing device to be set if the result of the verification performed based on the model data is a successful result.

16. The hearing device according to claim 15, wherein the processing unit is configured to allow the hearing device to be set by receiving fitting data to configure the hearing device.

17. The hearing device according to claim 15, wherein the processing unit is configured to change the model data in response to a signal transmitted by an external device.

18. The hearing device according to claim 15, wherein the processing unit is configured to change the model data in response to a change in the functionality of the hearing device.

19. The hearing device according to claim 15, wherein the processing unit is configured to perform the verification by verifying the model data.

20. The hearing device according to claim 19, wherein the processing unit is configured to verify the model data by verifying a signature.

21. The hearing device according to claim 20, wherein the signature is that of the model data.

22. The hearing device according to claim 15, wherein the model data comprises a model name and/or a model identifier, and wherein the processing unit is configured to perform the verification based on the model name and/or the model identifier.

23. The hearing device according to claim 22, wherein the processing unit is configured to perform the verification by determining if a verification criterion based on the model name and/or the model identifier is fulfilled, and wherein verification fails if the verification criterion is not met.

24. The hearing device according to claim 22, wherein the processing unit is configured to perform the verification by performing a check function based on the model name and/or the model identifier.

25. The hearing device according to claim 24, wherein the processing unit is configured to obtain model information by selecting the model information from available model information that corresponds to the model name and/or the model identifier, and to compare a result of the check function with the selected model information.

26. The hearing device according to claim 24, wherein the processing unit is configured to determine that the verification fails if a result of the check function does not match a corresponding model information.

27. The hearing device according to claim 15, wherein the memory unit has a manufacture unit identifier stored therein, and wherein the processing unit is configured to perform the verification also based on the manufacture unit identifier.

28. The hearing device according to claim 15, wherein the processing unit is configured to proceed to a model update mode or a non-operative mode of the hearing device if the verification fails.

29. The hearing device according to claim 15, wherein the processing unit is configured to obtain the result of the verification from an electronic device.

30. The hearing device according to claim 29, wherein the electronic device comprises a handheld device, a tablet, a computer, a phone, or a USB.

31. The hearing device according to claim 30, wherein the electronic device is configured for use by the user of the hearing device.

32. The hearing device according to claim 30, wherein the electronic device is configured for use by a dispenser.

33. The hearing device according to claim 29, wherein the electronic device is configured for use by the user of the hearing device.

34. The hearing device according to claim 29, wherein the electronic device is configured for use by a dispenser.

35. A hearing system comprising the hearing device of claim 29.

36. The hearing system according to claim 35, further comprising the electronic device.

37. The hearing system according to claim 36, wherein the electronic device is configured to communicate with the hearing device.

38. The hearing system according to claim 37, wherein the electronic device is also configured to communicate with a server.

39. The hearing system according to claim 36, wherein the electronic device comprises a handheld device, a tablet, a computer, a phone, or a USB.

40. The hearing system according to claim 39, wherein the electronic device is configured for use by the user of the hearing device.

41. The hearing system according to claim 39, wherein the electronic device is configured for use by a dispenser.

42. The hearing system according to claim 36, wherein the electronic device is configured for use by the user of the hearing device.

43. The hearing system according to claim 36, wherein the electronic device is configured for use by a dispenser.

44. The hearing device according to claim 15, wherein the model data in the memory is provided by a manufacturing device.

45. A hearing system comprising the hearing device of claim 44.

46. The hearing system of claim 45, further comprising the manufacturing device.

47. A method performed by the hearing system of claim 36, comprising:
   transmitting a message from the hearing device to the electronic device;
   transmitting a request from the electronic device to a server;
   receiving, by the electronic device, a server response from the server; and
   receiving information from the electronic device.

48. The method according to claim 47, wherein the information from the electronic device is based on the server response.

49. A method performed by the hearing system of claim 38, comprising:
   transmitting a message from the hearing device to the electronic device;
   transmitting a request from the electronic device to the server;
   receiving, by the electronic device, a server response from the server; and
   receiving, by the hearing device, information from the electronic device.

50. The method according to claim 49, wherein the information from the electronic device is based on the server response.

* * * * *